US012576777B2

(12) United States Patent　　　　(10) Patent No.:　US 12,576,777 B2

Tirado et al.　　　　　　　　　　(45) Date of Patent:　Mar. 17, 2026

(54) LIGHTING APPARATUS FOR WHEELS

(71) Applicants: Mark Tirado, Elk, WA (US); Michael Titus, Elk, WA (US)

(72) Inventors: Mark Tirado, Elk, WA (US); Michael Titus, Elk, WA (US)

( * ) Notice: Subject to any disclaimer, the term of this patent is extended or adjusted under 35 U.S.C. 154(b) by 46 days.

(21) Appl. No.: 18/924,672

(22) Filed: Oct. 23, 2024

(65) Prior Publication Data

US 2025/0236235 A1　　Jul. 24, 2025

Related U.S. Application Data

(60) Provisional application No. 63/624,593, filed on Jan. 24, 2024.

(51) Int. Cl.
| | |
|---|---|
| *B60Q 1/32* | (2006.01) |
| *B60B 7/00* | (2006.01) |
| *B60Q 1/26* | (2006.01) |
| *F21V 3/02* | (2006.01) |
| *H05B 45/20* | (2020.01) |
| *H05B 47/155* | (2020.01) |
| *F21Y 115/10* | (2016.01) |

(52) U.S. Cl.
CPC .............. *B60Q 1/326* (2013.01); *B60B 7/006* (2013.01); *B60Q 1/2696* (2013.01); *F21V 3/02* (2013.01); *H05B 45/20* (2020.01); *H05B 47/155* (2020.01); *F21Y 2115/10* (2016.08)

(58) Field of Classification Search
CPC ...... B60B 7/006; B60Q 1/2696; B60Q 1/326; H05B 45/20; H05B 47/155; F21V 3/02
See application file for complete search history.

(56) References Cited

U.S. PATENT DOCUMENTS

| | | | | |
|---|---|---|---|---|
| 5,634,707 | A * | 6/1997 | Bailey, Jr. .............. | B60Q 1/326 |
| | | | | 362/500 |
| 6,220,733 | B1 * | 4/2001 | Gordon .................. | B60Q 1/326 |
| | | | | 362/500 |
| 6,530,683 | B1 * | 3/2003 | Ohkohdo .............. | F21S 43/247 |
| | | | | 362/500 |
| 9,266,386 | B2 * | 2/2016 | Wang .................... | B60B 7/0013 |
| 9,868,318 | B2 * | 1/2018 | Becker .................. | B60B 7/006 |
| 10,052,910 | B2 * | 8/2018 | Moore ................. | H02K 11/042 |
| 11,383,635 | B1 * | 7/2022 | Deniz .................... | B60B 7/068 |
| 12,083,825 | B2 * | 9/2024 | Huynh .................. | B60B 7/004 |
| 2003/0169595 | A1 * | 9/2003 | Lee ........................ | B60Q 1/326 |
| | | | | 362/500 |
| 2004/0125612 | A1 * | 7/2004 | Jackson ................. | B60Q 1/326 |
| | | | | 362/500 |
| 2004/0130905 | A1 * | 7/2004 | Olds ...................... | B60Q 1/326 |
| | | | | 362/500 |

(Continued)

*Primary Examiner* — Gerald J Sufleta, II

(74) *Attorney, Agent, or Firm* — Barry Choobin; Patent 360 LLC

(57) ABSTRACT

A lighting apparatus for automotive wheels that can create different light patterns. The lighting apparatus includes a base member configured to mount within a wheel; a light member configured to mount to a central portion of the base member, wherein the light member comprises a plurality of LEDs; a cover member configured to mount over and cover the light member, wherein the cover member is configured to reflect light over the base member; and a cap member configured to mount over the light member such that the cover member lies between the cap member and the light member.

9 Claims, 5 Drawing Sheets

(56)             References Cited

U.S. PATENT DOCUMENTS

| 2006/0082213 A1* | 4/2006 | Tirado | ..................... B60B 7/14 |
| | | | 301/37.109 |
| 2009/0058177 A1* | 3/2009 | Berens | ..................... B60B 7/20 |
| | | | 301/37.25 |
| 2010/0014303 A1* | 1/2010 | Wang | ..................... B60Q 1/326 |
| | | | 362/500 |
| 2022/0314689 A1* | 10/2022 | Wells | ..................... B60B 7/006 |

* cited by examiner

110

120

130

150

160

130    10

LIGHTING APPARATUS FOR WHEELS

CROSS-REFERENCE TO RELATED APPLICATIONS

This application claims priority from a U.S. Provisional Patent Appl. No. 63/624,593, filed on Jan. 24, 2024, which is incorporated herein by reference in its entirety.

FIELD OF INVENTION

The present invention relates to a lighting apparatus for wheels, and more specifically, the present invention relates to a reflective lighting apparatus for different light patterns.

BACKGROUND

The use of some kind of lightning in automotive vehicle wheels is becoming common for aesthetic appearance as well as for safety purposes. The demand for lighting devices integrated into automotive wheels is rising. However, incorporating the lights into wheels suffers from several limitations. For example, only limited patterns of light can be created due to wheel design. The rotation of the wheel also limits the choice of light patterns. Poor road conditions and rotating wheels significantly limit the light design choices.

Another difficulty arises due to the lack of available space in the wheel for affixing a lighting device. In the art, attempts have been made to use light sources or light-implementing means mounted on vehicles or some type of mechanical or other means to transmit light from a fixed source on the vehicle to the wheels.

Currently, available devices can provide illumination to automobile wheels in limited ways; for example, illumination is provided by arranging an electric lamp between a pair of wheel spokes, using a translucent plastic base with an electrical bulb, and grounding to the hubcaps lamp sockets that hold incandescent bulbs and connect electrically to the automobile battery. While such devices may fulfill their respective objectives, they suffer from several disadvantages. The light sources often generate unstructured and highly attenuated reflections with limited light patterns because of reflective conditions on contaminated surfaces and wheel designs.

Thus, a need is appreciated for a device that can overcome the drawbacks of conventional lighting devices for automobile wheels.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The present invention aims to solve the problems associated with conventional lighting devices for automotive wheels through a novel lighting apparatus.

An object of the present invention is that the lighting apparatus can produce aesthetic light patterns on wheels.

Still, another object of the present invention is that the lighting apparatus can create multiple types of patterns.

A further object of the present invention is that the lighting apparatus can create light patterns on the wheel independent of the wheel type and surface.

In one aspect, disclosed is a lighting apparatus that includes channels and cavities that direct the flow of light and channel it through various areas of the wheel; running light from the central (center) area toward the outer edge; and a cover, along with a base, for trapping the light or creating areas that allow the light to escape visually.

In these respects, the light reflective system for wheels according to the present invention maximizes the infinite possibilities of light patterns regardless of wheel design.

In one aspect, disclosed is a lighting apparatus for automotive wheels, and an automatic wheel comprising the lighting apparatus. The lighting apparatus comprises a base member configured to mount within a wheel; a light member configured to mount to a central portion of the base member, wherein the light member comprises a plurality of lighting means; a cover member configured to mount over and cover the light member, wherein the cover member is configured to reflect light over the base member; and a cap member configured to mount over the light member such that the cover member lies between the cap member and the light member.

In one aspect, the cap member comprises a dome-shaped cavity configured to disperse light from the light member. The lighting comprises a plurality of LEDs. The plurality of LEDs are of a plurality of colors. The lighting apparatus further comprises a control circuitry for operating the plurality of LEDs. The cover member comprises a plurality of channels and cavities configured for guiding the light from the light member.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limited to embodiments of the invention. As used herein, the singular forms "a", "an" and "the" are intended to include the plural forms as well, unless the context clearly indicates otherwise. It will be further understood that the terms "comprise", "comprising,", "includes" and/or "including" when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

All illustrations of the drawings are to describe selected versions of the present invention and are not intended to limit the scope of the present invention.

The invention described pertains to a lighting apparatus for automotive wheels that allows for creating a wide range of light patterns on the wheels. The disclosed apparatus can control and guide the flow of light through channels and cavities for creating different light patterns. Different light patterns can be created independent of the wheel type and wheel surface.

Figure 1:
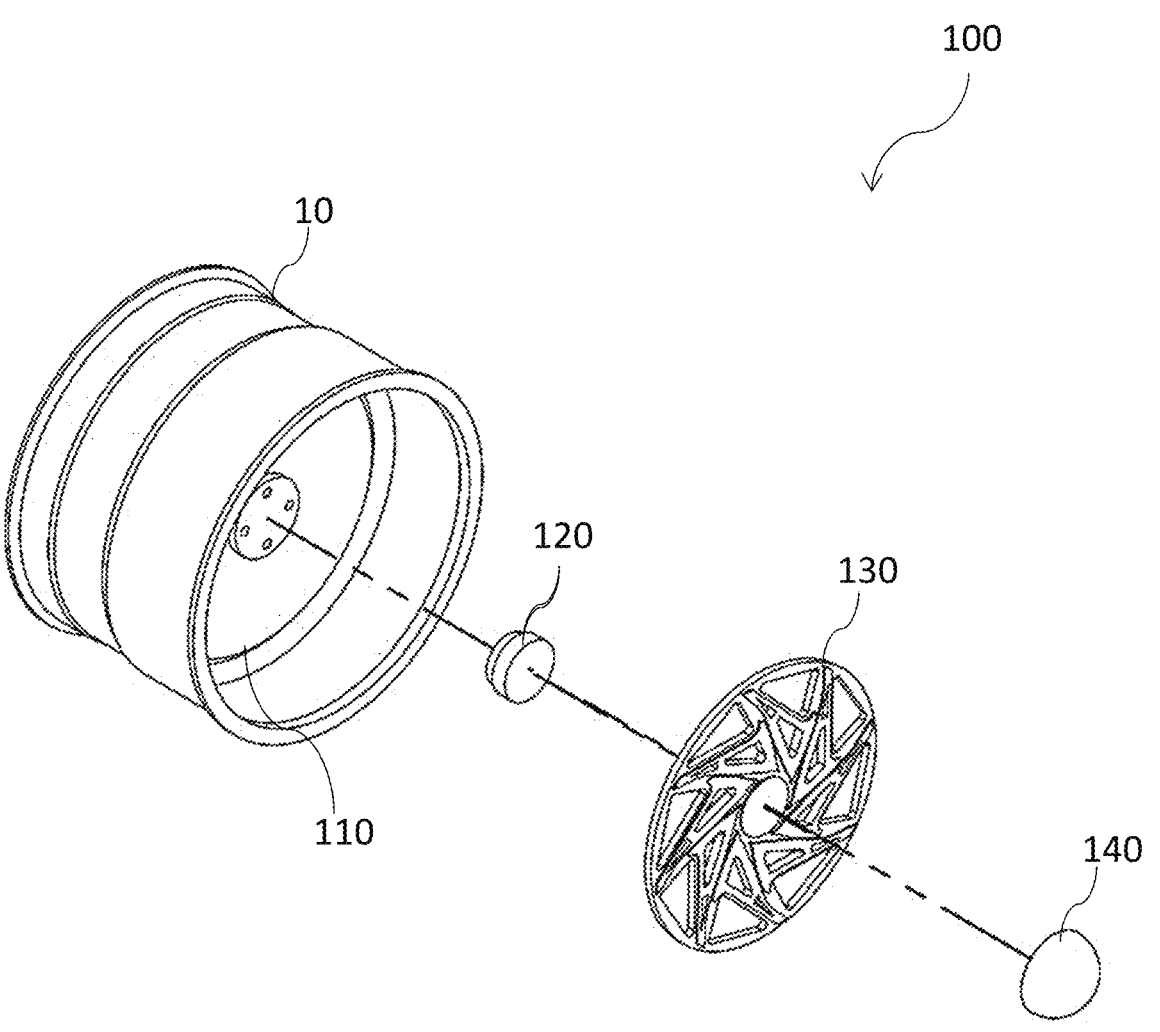
FIG. 1 shows a partially exploded view of the lighting apparatus relative to the wheel, according to an exemplary embodiment of the present invention.
Figure 2:
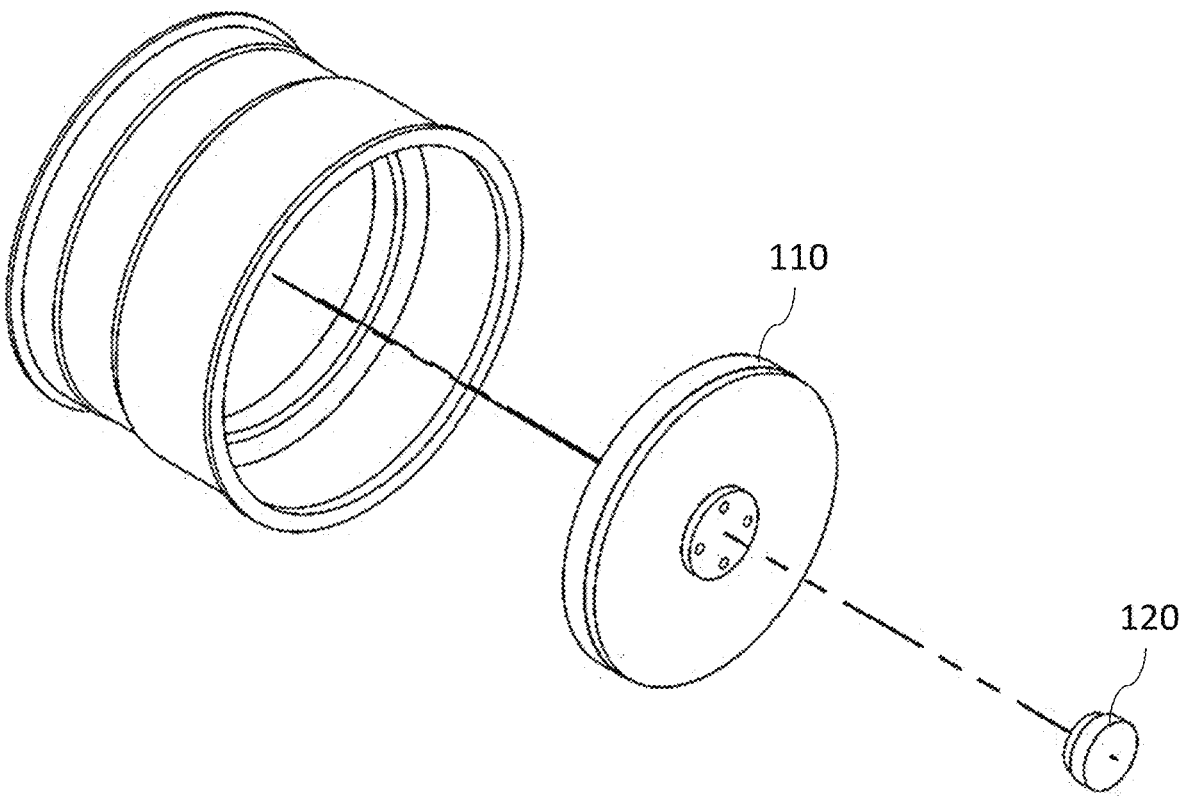
FIG. 2 shows another partially exploded view of the lighting apparatus relative to the wheel, according to an exemplary embodiment of the present invention.
Figure 3:
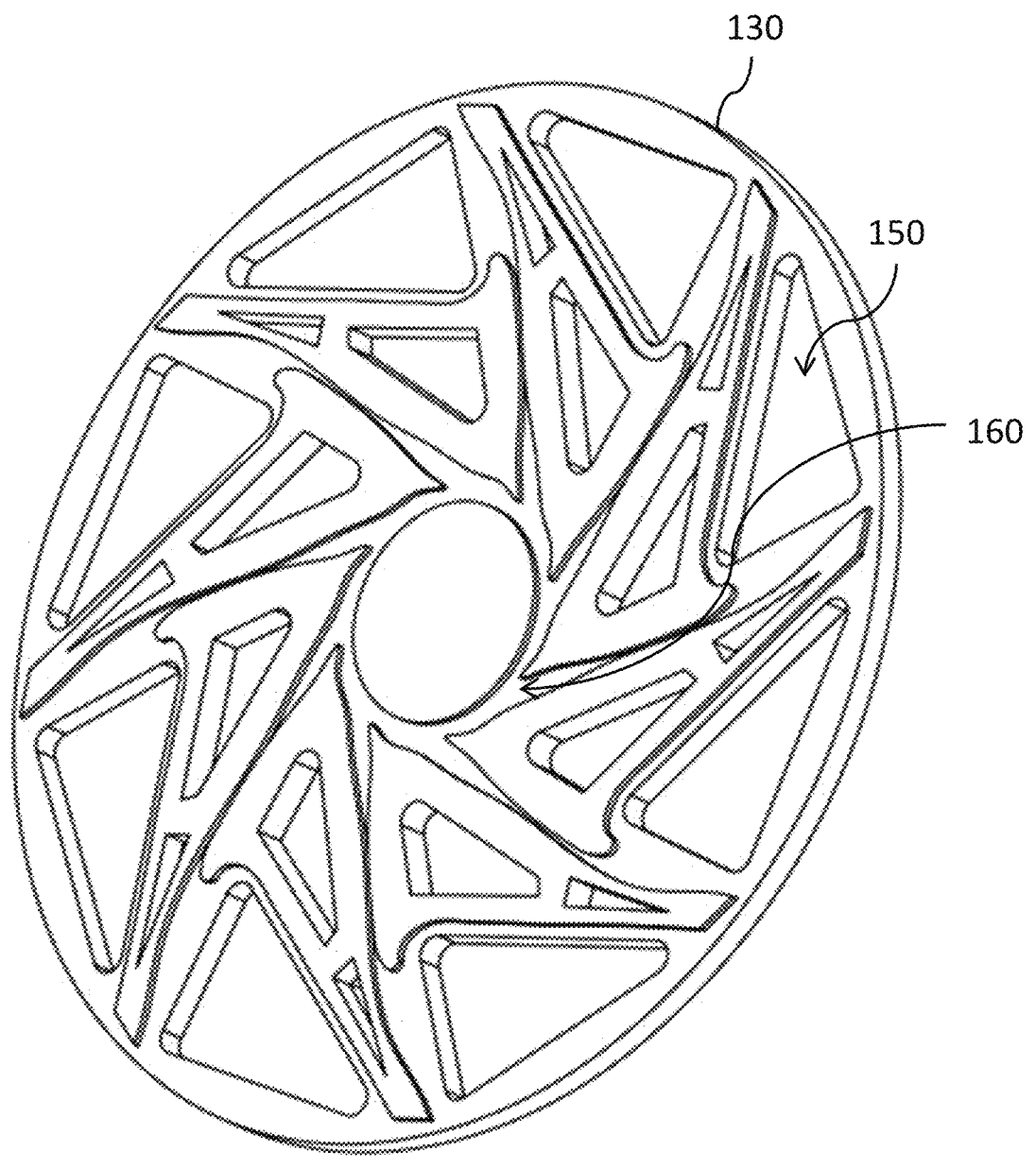
FIG. 3 shows a cover of the lighting apparatus, according to an exemplary embodiment of the present invention.
Figure 4:
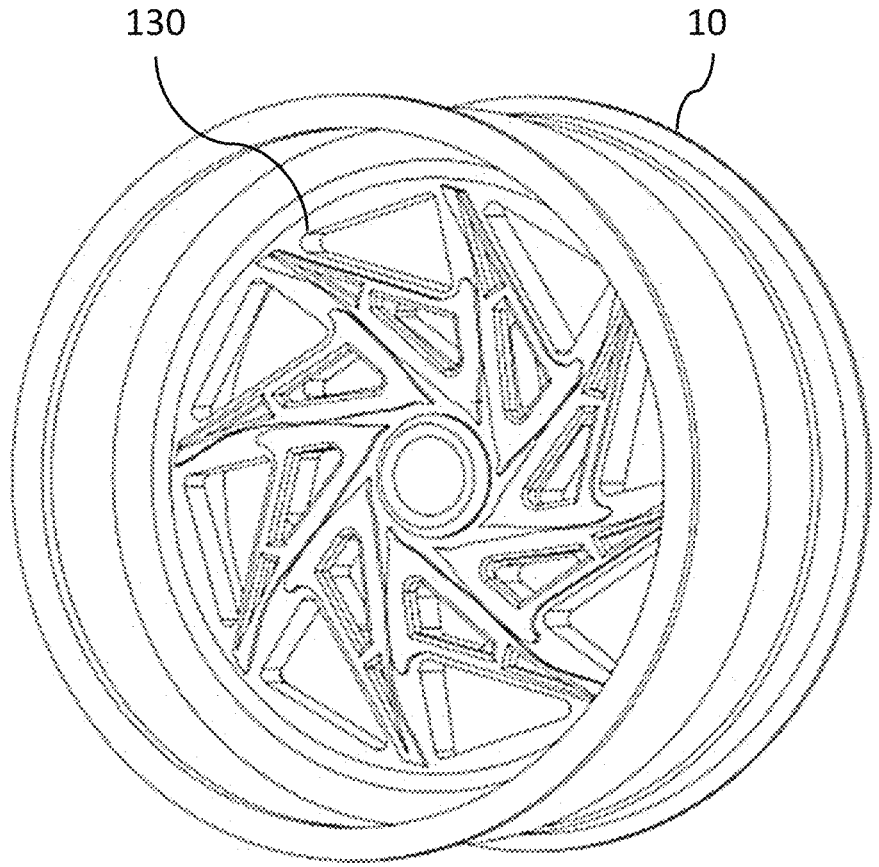
FIG. 4 shows the lighting apparatus without a cap mounted on the wheel, according to an exemplary embodiment of the present invention.
Figure 5:
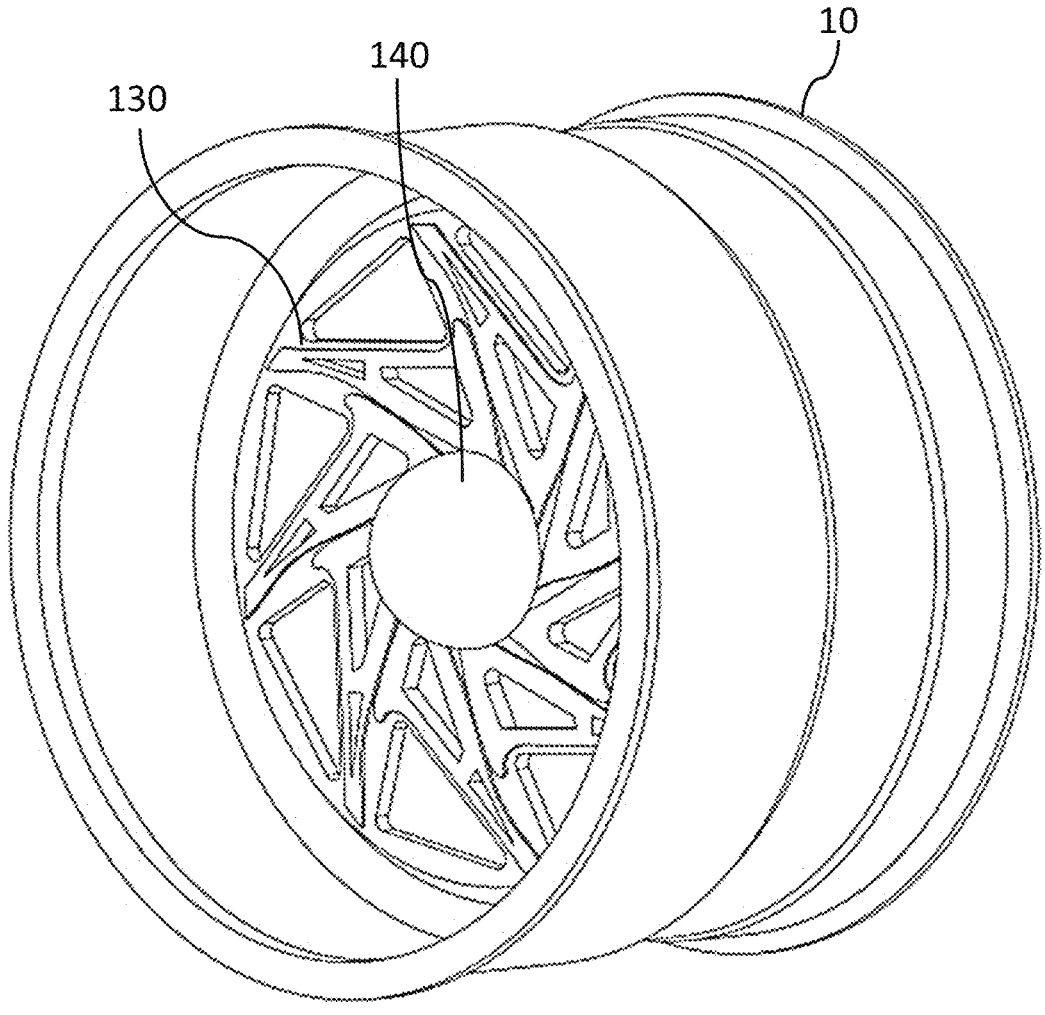
FIG. 5 shows the lighting apparatus mounted on the wheel, according to an exemplary embodiment of the present invention.

Referring to FIGS. 1-5, the disclosed lighting apparatus 100 can include a base member 110, a light member 120, a cover member 130, and a cap member 140. FIG. 1 shows an exploded view of the disclosed apparatus 100 and a wheel 10. FIG. 1 shows the base member mounted on the wheel, and the light member, the cover member, and the cap member are shown separately in an exploded view. FIG. 2 shows the base member and the light member relative to the wheel. FIG. 3 shows a perspective view of the cover member. FIG. 4 shows the system mounted on the wheel but without a cap member. FIG. 5 shows the cap member mounted to the system as shown in FIG. 4.

As shown in FIG. 2, the base member can be first mounted to a wheel. The wheels are available in different sizes, and also wheels are manufactured in standard sizes. The base member can be manufactured for various wheel sizes. The variation in the shape and size of the base member is within the scope of the present invention, and any such variation can be according to the wheel size. Moreover, the wheel may include conventional components, for example, lug nuts and a brake rotor.

The light member can be attached to the base member and the cover member can be mounted to the base member covering the light member. The light member may include a plurality of lights, such as LEDs. The light member can be positioned in the central area of the wheel and fastened to the base member. Preferably, the light member can be strongly fastened to the base member or integrated with the base member. This is to prevent the light member from separating from the base member due to centrifugal forces acting on the light member while the wheel rotates at high speed.

The light member can also be positioned in various directions. For example, the light member can be positioned to direct light outward, away from the central area of the base member. The light member can also be positioned to provide light toward the interior of the wheel. Such a configuration of the light member can be customized as and when desired for the desired light pattern.

The light member can include multiple LEDs of different colors and control circuitry to manage the operation of multiple LEDs. LEDs of different colors can be operated in predefined configurations for generating multiple shades of light. The control circuitry can be configured by a user for desired light shade or themes of light patterns. For example, the user can connect with the control circuitry through a user device and can configure the desired light shade or pattern of light, or a theme of light pattern. It is to be noted that one or more LEDs in the light member and one or more LEDs of the same or different colors are within the scope of the present invention. Also, the light member can project various colors, as desired for any effect. The user selects the color of the light via various means and mechanisms known in the art, and any such means is within the scope of the present invention. For example, hard buttons can be provided on any member of the apparatus for selecting a color or effect of light. The user can connect through a wired or wireless connection using a user device. In certain implementations, the user device can be a phone, a smartphone, a desktop computer, a laptop, a tablet computer, or the like. Also, a remote control can be used to make a selection of the light. The remote control can be connected through a wired or wireless connection. Moreover, instructions via infrared commands can also be sent by remote control.

The base member may include wiring that extends from the light member positioned on the base member. In some embodiments, the wiring may be embedded within the base member. In other embodiments, the wiring may run along a path and/or a channel formed on the inside portion of the base member.

In some embodiments, the cover member may be positioned over the light member. The cover member can be configured to protect the light member from physical- or weather-related damage, diffuse the light from the light member, and provide an aesthetically pleasing appearance for the exterior area where the base member is positioned. The cover member can be opaque, transparent, patterned, colored, or the like. As shown in FIG. 3, the cover may include cavities 150 and channels 160 or other suitable designs and structures to generate different types of light patterns spread over the base member.

In one embodiment, the cover member is positioned on the base member, which can function to trap the light between the cover member and the base member. The cover member can include multiple channels and cavities that can be configured to channel the light through various areas of the wheel. In one example, the light from the light member may run from the central area toward the edge of the base member. The cover member, which includes channels or cavities, can be made from any suitable material, including cast, forged, and flow-formed materials.

In some embodiments, the cover member may be one continuous piece. Also, the cover member may comprise multiple pieces or inserts with cavity covering aspects to trap the light or create areas that allow the light to escape. The cover member, with various configurations of channels and cavities, can provide various lighting patterns on the wheel. For example, as shown in FIG. 4, the apparatus may include various areas in which the channels, by design, open and allow the light to emit into other areas. By design, slits (channel walls) can be constructed to open gaps to outer areas of the cover to allow the light to be viewable on the exterior. Other areas can be completely enclosed (no slits) to maximize the illuminations through the channels or cavities.

As shown in FIGS. 1 and 5, the cap can be disposed on the cover member to fasten the cover member on the base member of the apparatus. In one aspect, the cap may include a dome-shaped cavity. The cap can be positioned in the central area of the base member. The dome-shaped cavity of the cap member can enhance and disperse the light from the light member placed in the central location of the base member to the channels and other cavities in the cover member.

The apparatus may include a switch with a battery. The switch may be remotely controlled to allow the user to choose when to power on and off the light member. In another embodiment, the battery and switch may be located in the center of the base member. The battery and switch can also be positioned in any other location with suitable configuration.

Although the invention has been explained in relation to its preferred embodiment, it is to be understood that many other possible modifications and variations can be made without departing from the spirit and scope of the invention.

The base member may also include a suitable coating for reflecting the lights. The coating itself can manipulate the light, and different types of coatings that can reflect and/or manipulate the light falling on the coated surface are within the scope of the present invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A lighting apparatus for automotive wheels, the lighting apparatus comprises:

a base member configured to mount within a wheel;

a light member configured to mount to a central portion of the base member, wherein the light member comprises a plurality of light sources, wherein the light member is of a cylindrical shape;

a cover member configured to mount over and cover the light member, wherein the cover member is configured to reflect light over the base member, wherein the cover member comprises a plurality of channels and cavities configured for guiding the light from the light member allowing the light to emit into other areas, wherein the cover member is configured to fit within the wheel; and a cap member configured to mount to the base member such that the cover member lies between the cap member and the light member, wherein the cap member comprises a dome-shaped cavity configured to disperse light from the light member.

2. The lighting apparatus of claim 1, wherein the light sources comprises a plurality of LEDs.

3. The lighting apparatus of claim 2, wherein the plurality of LEDs are of a plurality of colors.

4. The lighting apparatus of claim 3, wherein the lighting apparatus further comprises a control circuitry for operating the plurality of LEDs.

5. A wheel comprising:

a lighting apparatus for automotive wheels, the lighting apparatus comprises:

a base member configured to mount within the wheel;

a light member configured to mount to a central portion of the base member, wherein the light member comprises a plurality of light sources, wherein the light member is of a cylindrical shape;

a cover member configured to mount over and cover the light member, wherein the cover member is configured to reflect light over the base member, wherein the cover member comprises a plurality of channels and cavities configured for guiding the light from the light member, wherein the cover member is configured to fit within the wheel; and a cap member configured to mount over the light member such that the cover member lies between the cap member and the light member, wherein the cap member comprises a dome-shaped cavity configured to disperse light from the light member.

6. The wheel of claim 5, wherein the light sources comprises a plurality of LEDs.

7. The wheel of claim 6, wherein the plurality of LEDs are of a plurality of colors.

8. The wheel of claim 7, wherein the lighting apparatus further comprises a control circuitry for operating the plurality of LEDs.

9. The lighting apparatus of claim 1, wherein the cover member further comprises inserts within the plurality of channels and cavities covering aspects to trap the light.

* * * * *